United States Patent [19]
Pichat

[11] Patent Number: 5,377,604
[45] Date of Patent: Jan. 3, 1995

[54] METHOD FOR THE OBTAINING OF MOLDED STABILIZED MATERIALS FROM WASTES

[76] Inventor: Philippe Pichat, 18, Rue des Tournelles, 75004 Paris, France

[21] Appl. No.: 96,910

[22] Filed: Jul. 26, 1993

[30] Foreign Application Priority Data

Jul. 24, 1992 [FR] France .................. 92 09196

[51] Int. Cl.⁶ ........................................ F23G 7/04
[52] U.S. Cl. .................................. 110/346; 106/697; 106/705; 110/238; 588/252; 588/256; 588/257
[58] Field of Search ............ 106/697, 705, 707, 708, 106/734, DIG. 1; 588/252, 256, 257; 110/346, 238

[56] References Cited
U.S. PATENT DOCUMENTS

| | | | |
|---|---|---|---|
| 3,880,664 | 4/1975 | Schulze | 106/99 |
| 4,112,033 | 9/1978 | Lingi | 588/252 X |
| 4,375,986 | 3/1983 | Pichat . | |
| 4,547,290 | 10/1985 | Pichat . | |
| 4,880,582 | 11/1989 | Spanjer et al. | 106/DIG. 1 X |
| 5,103,578 | 4/1992 | Rickard | 110/346 X |
| 5,177,305 | 1/1993 | Pichat . | |
| 5,239,936 | 8/1993 | Wichner et al. | 106/705 X |
| 5,252,127 | 10/1993 | Pichat | 106/705 |

FOREIGN PATENT DOCUMENTS

| | | |
|---|---|---|
| 0375913 | 11/1989 | European Pat. Off. . |
| 0389328 | 9/1990 | European Pat. Off. . |
| 0427899 | 5/1991 | European Pat. Off. . |
| 2570319 | 3/1986 | France . |
| 8809228 | 12/1988 | WIPO . |
| 9111253 | 8/1991 | WIPO . |

*Primary Examiner*—Edward G. Favors
*Attorney, Agent, or Firm*—Pollock, Vande Sande & Priddy

[57] ABSTRACT

Disclosed is a method for obtaining stabilized molded materials from wastes, said method consisting of mixing the waste with a soldification agent and in extrusion molding the material obtained under vacuum and at constant temperature. The corresponding installation has a mixer connected to the molding device.

9 Claims, 1 Drawing Sheet

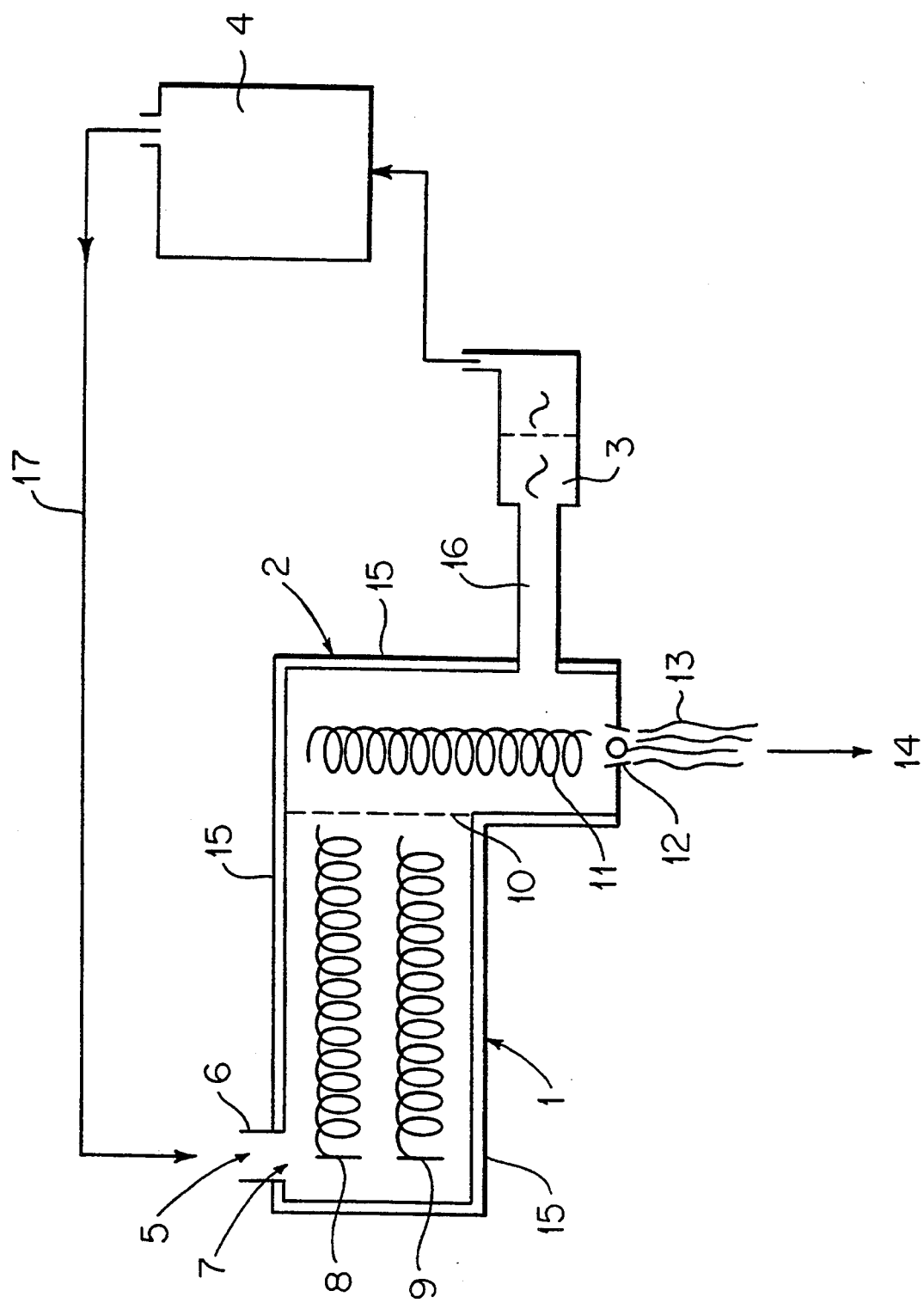

METHOD FOR THE OBTAINING OF MOLDED STABILIZED MATERIALS FROM WASTES

RELATED CO-PENDING APPLICATIONS

U.S. Ser. No. 07/498,082, filed Mar. 20, 1990;
U.S. Ser. No. 07/799,835, filed Nov. 29, 1991;
U.S. Ser. No. 07/498,081, filed Mar. 20, 1990;
U.S. Ser. No. 07/853,178, filed Mar. 17, 1992;
U.S. Ser. No. 07/876,018, filed Apr. 28, 1992;
U.S. Ser. No. 07/769,661, filed Oct. 2, 1991;
U.S. Ser. No. 08/002,840, filed Jan. 15, 1993.

BACKGROUND OF THE INVENTION

1. Field of the Invention

The present invention pertains to the field of the processing, by solidification, of the wastes of various types with a view to the obtaining of inert materials capable of being stored in an appropriate site.

More particularly, it pertains to a method as well as to the appropriate installation for the obtaining, from wastes in a variety of forms, of molded materials, for example by extrusion, the physical/chemical stability of which has been notably improved.

2. Description of the Prior Art

Until now, the wastes solidification technique has consisted of introducing the waste simultaneously with at least one solidification agent into a mixer of the same type as those used for the manufacture of concrete. The hardened or solidified mixture is then removed for dumping in an appropriate site.

Apart from the fact that this technique is done discontinuously, there is no precise control over the temperature or the rheological characteristics of the waste and of the mixture of this waste with the solidification reagents. In view of the importance of these parameters, as shall be seen further below, as regards the various complex reactions leading to the stabilization of the wastes, it is not possible to meet the quality requirements currently prevailing in the ecological field.

One of the essential aims of the invention is to obtain optimum stability in storage after solidification for all the main types of the most common wastes as well as to devise a method of continuous industrial-scale treatment that can be adapted to many types of wastes and can be used to convert these wastes into molded masses that are extruded, for example, and are capable of being stored directly at the dumping sites.

SUMMARY OF THE INVENTION

The invention makes use of the known technique of mixing the waste with one or more reagents and/or hydraulic binders to ensure inertness, followed by the forced passage of the mass, which is in a fluid state, through an extruder to obtain a molded material.

However, according to these essential characteristics which enable the above-mentioned problem to be resolved, the method of the invention is characterized in that the waste, which is conditioned in the form of a mixture with the reagent or reagents at a liquid limit ranging from 25% to 45%, is mixed under a high vacuum at a controlled temperature which is substantially constant for a given type of waste.

The fact of making and maintaining the mixture under a permanent vacuum kept in practice between 0.1 and 10 mm of Hg, has many advantages: first of all, it is possible in this way to eliminate all the volatile products at ordinary temperature that are contained in the wastes, notably industrial wastes: these volatile products are, for example, light hydrocarbons, organic solvents, ammonia, amines, etc. which are products that are undesirable for the long-term stability of the materials obtained. Then, under the effect of a high vacuum, the various particles approach one another to constitute the extruded material, this approach leading to a valuable decrease in porosity and an increase in cohesion. Finally, simultaneously with these phenomena, the continuous progress of the material in the mixing and extrusion process prompts a permanent renewal of the surfaces exposed to vacuum and thus properly gives a final extruded material a homogeneity far greater than that obtained by the conventional technique.

Total control over the temperature is also an important and critical parameter in the method of the invention. Indeed, essentially the following factors depend on this temperature: the vapor tensions of the constituent elements of the mixture as well as the speeds of the various reactions which take place during the stabilization phenomenon such as reactions of precipitation, substitution, absorption, hydration and solidification. The temperature of the mixture varies essentially for two reasons: firstly the triggering of exothermic or endothermic reactions and, secondly, the conversion of the mechanical stirring energy in the mixer into thermal energy. As shall be seen further below, various means can be used, according to the invention, to control and optimize this temperature.

According to another characteristic of the invention, the operations of mixing and extrusion molding under vacuum are coupled to an incineration of the waste under vacuum, and the wastes from smoke purification (SPW) that come from the incineration are recycled in the mixing operation.

An object of the invention is also an installation for the implementation in continuous operation of the above-mentioned method. The installation comprises the combination of a mixer connected, by a screen for the division of the mixture of wastes during stabilization, to a molding device provided with screws with an extrusion head, said molding device being connected without hindrance, by means of vacuum pump(s), to an incinerator. The mixer and the molding device are provided with a means for the adjusting and control of the temperature in order to ensure, as the case may be, the heating or cooling of the wastes undergoing solidification.

BRIEF DESCRIPTION OF THE DRAWING

To make it easier to understand the invention, and to provide other details and features, a description shall now be given of an embodiment and a mode of operation, on a non-restrictive basis, with reference to a simplified drawing, as shown in the single appended FIGURE, of an installation for the implementation of the above-described method.

DETAILED DESCRIPTION OF THE INVENTION

The waste stabilization installation, capable of working continuously, essentially comprises: a mixing vessel or reactor 1, followed by an extruder type of molding device 2, these elements being kept under vacuum by a pumping set 3 (for example two-stage pumps) connected to an incinerator 4 for the volatile materials recovered.

The waste 5, in a form that shall be specified here below is introduced by the fitting element 6 into the mixer 1, and the reagent or reagents designed for the stabilization, for example stabilization agents of a type known per se, are added through the opening 7. The entire mixture is mixed, for example by the screws 8, 9 which, however, may be replaced by stirrers or other known means. The mixture is made to pass through a perforated screen-type assembly 10 type to divide the material before it is introduced automatically into the extruder 2 where the screw 11 forces the material to pass into the nozzle 12, the stabilized waste 13 emerging in a sausage shape or any other desired shape, after which it is sent in the direction of the arrow 14 to the storage site.

The mixer 1 and the extruder 2 are advantageously made in the form of a double wall 15 within which there flows a heat-conveying fluid, for example, of the Giltherm (registered mark) or other type, to ensure the temperature regulation.

The installation is connected by the piping system 16 to the vacuum pumps 3 and the volatile products of the waste, collected by the high depression, for example, a depression of 0.5 to 5 mm of Hg, are sent to the incinerator 4. According to an advantageous arrangement of the invention, the residues or wastes from smoke purification (SPR or SPW) are sent in the direction of the arrow 17 to the top of the mixer 1. By operating in this way, the aim of the invention, which is to obtain a system that has no environmentally harmful discharges, is achieved by means of the technique summarized here above.

In practice, every type of waste may be subjected to the treatment according to the invention including notably: incineration residues and municipal, industrial and hospital wastes. These wastes may be originally in various forms, for example in the form of liquids, solids, sludge, pastes etc.

However, as specified here above, wastes or mixtures that are excessively fluid or excessively paste-like and that do not have the liquid limits within the bracket indicated here above are excluded from the field of application of the invention. When the wastes are in solid form, as for example polluted earth or other matter, the mean diameters of the materials should preferably be smaller than 100 microns.

According to a preferred embodiment, it is seen to it that the mixture introduced into the mixer and constituted by the wastes and the reagent or solidification/stabilization agent takes the form of a paste having the liquid limit within the above-mentioned bracket.

For a clearer understanding of the value of the method and device of the invention, a description shall be given here below of the results of experiments, chosen from among many others, wherein the performance characteristics as regards the stability of materials of wastes obtained from the known mixing/extrusion method are compared with the performance characteristics of those obtained by the implementation of the above-mentioned device.

EXAMPLARY EMBODIMENTS

As in the case of the French patent No. FR-A-2-644-342, the waste on which the treatment carried out was an incinerated fly ash from household garbage with the following approximate composition: Si: 23%; Al: 7.0%; Fe: 4.0%; Pb: 1.0%; Zn: 1.9%; Ca: 8%; Mg: 2.5%; Ba: 0.3%; K: 4%; Na: 3%; Ti: 0.7%; Cd: 0.03%; Sn: 0.3%; Cr: 0.1%; Cl: 1%; S: 3%; N: 4%; P: 5%; organic carbon: 1% incombustible matter.

A representative sample of fly ash such as this, subjected to the French standard DIN 38414, gave the following toxic elements, expressed in ppm (parts per million), by leaching: Pb: 6.3; Cu: 0.2; Cd: 60; Zn: 900; Fe: 0.2.

a) A first series of tests comprised the addition, to 133.3 kg of fly ash, of 30 kg of water in which 0.183 Kg of quick lime CaO had been dispersed, with mixing in the usual way. After the compacting of the material obtained for the leaching operations, according to the above-mentioned standard DIN 38414 and after three months, the following results were obtained (in ppm): Pb: 0.4; Cr: 0.2; Cu: <0.1; Cd <0.2; Zn: 1.5, and the compressive strength was 8.5 megaPascals.

b) In a second series of tests, whereas in the foregoing tests the mixing was done in the traditional way similar to that of the manufacture of Portland cement concrete, the same experiments were resumed on the same waste, all other conditions being equal except that the mixing/extruding operations were done under vacuum and at controlled temperature, according to the same mode of implementation as in the drawing of the FIGURE appended hereto. The temperature was kept substantially at 20° C. and the depression (or vacuum) corresponded to 0.5 mm of Hg.

The leaching of the extruded material gave the following results (ppm):
Pb: <0.1; Cr: <0.1; Cu: <0.1; Cd <0.1; Zn <0.1. The stability of the molded waste was therefore very substantially improved.

Furthermore, whereas, in the conventional industrial-scale mixing devices, it was possible to process 12 tons of wastes per hour under power of 270 HP, the method and goal of the invention enabled a substantially higher work rate of 18 tons of wastes per hour.

What is claimed is:

1. A method for the obtaining of molded materials, stabilized at the physical/chemical level, from wastes of various types and origins, said method comprising the steps: mixing the waste with at least one solidification agent of the hydraulic binder type, and in carrying out extrusion molding of the solid material obtained, wherein the waste, conditioned in the form of a mixture with a liquid limit ranging from 25% to 45%, is mixed under high vacuum at a controlled temperature that is substantially constant for a given type of waste, the operation being done continuously.

2. A method according to claim 1, wherein the vacuum in said continuous operation corresponds to an interval of 0.1 to 10 mm Hg.

3. A method according to either of the claims 1 or 2, wherein the operations of mixing under vacuum and extrusion molding are coupled with an incineration of volatile matter extracted from the waste by the vacuum and wherein the wastes from smoke purification (SPW) coming from the incineration operation are recycled during the mixing operation.

4. The method set forth in claim 1 wherein the waste, to which the solidification agent is mixed, is chosen from the group consisting of domestic refuse, incineration waste, industrial waste, and hospital refuse.

5. The method set forth in claim 1 further comprising the steps:

interposing a material dividing screen between the waste mixing and extrusion molding steps, the extrusion molding being produced when the material passing through the screen is subjected to an extrusion head mounted on a screw; and providing a clear vacuum path between the waste mix and an incinerator for combusting volatile materials derived from the waste mix.

6. The method set forth in claim 5 further comprising the step of adjusting the temperature of the waste being mixed thereby causing selective cooling or heating thereof.

7. The method set forth in claim 5 further comprising the step of adjusting the temperature of the waste being extruded thereby causing selective cooling or heating thereof.

8. The method set forth in claim 6 wherein the temperature adjustment is achieved by:

containing the mixed waste within a double wall container; and further wherein a heated fluid flows through the container.

9. The method set forth in claim 7 wherein the temperature adjustment is achieved by:

containing the extruded waste within a double wall container; and further wherein a heated fluid flows through the container.

* * * * *